(12) United States Patent
Mihara et al.

(10) Patent No.: US 6,453,295 B1
(45) Date of Patent: Sep. 17, 2002

(54) DIGITAL BROADCASTING RECEIVER

(75) Inventors: Yoshikazu Mihara, Kawanishi; Toyomi Yamagata, Matsubara, both of (JP)

(73) Assignee: Sanyo Electric, Co., Ltd., Osaka (JP)

( * ) Notice: Subject to any disclaimer, the term of this patent is extended or adjusted under 35 U.S.C. 154(b) by 0 days.

(21) Appl. No.: 09/479,231

(22) Filed: Jan. 7, 2000

(30) Foreign Application Priority Data

Jan. 11, 1999 (JP) ............................................. 11-003949

(51) Int. Cl.[7] ............................................... G10L 21/04
(52) U.S. Cl. ....................................... 704/500; 704/270
(58) Field of Search ............................... 704/500, 501, 704/502, 503, 504, 200, 270

(56) References Cited

U.S. PATENT DOCUMENTS

| 5,740,075 | A | * | 4/1998 | Bigham et al. | 340/825 |
| 5,822,324 | A | * | 10/1998 | Kostresti et al. | 370/487 |
| 6,041,056 | A | * | 3/2000 | Bigham et al. | 370/395.64 |
| 6,052,507 | A | * | 4/2000 | Niida et al. | 386/109 |
| 6,285,823 | B1 | * | 9/2001 | Saeki et al. | 386/125 |
| 6,311,204 | B1 | * | 10/2001 | Mills | 345/502 |

* cited by examiner

Primary Examiner—Richemond Dorvil
(74) Attorney, Agent, or Firm—Arent Fox Kintner Plotkin & Kahn

(57) ABSTRACT

The present invention provides a digital broadcasting receiver for receiving digital broadcasting such as BS digital broadcasting, in which a broadcast image and a broadcast voice are not shifted after a voice based or compressed internal voice data is inserted. The invention also provides a digital broadcasting receiver in which a broadcast image and a broadcast voice are not shifted after an image based on compressed internal image data is inserted.

2 Claims, 1 Drawing Sheet

DIGITAL BROADCASTING RECEIVER

BACKGROUND OF THE INVENTION

1. Field of the Invention

The present invention relates to a digital broadcasting receiver for receiving digital broadcasting such as BS digital broadcasting.

2. Description of the Prior Art

In a digital broadcasting receiver, compressed broadcast image or voice data is separated and reproduced from a transport stream (TS) obtained by receiving digital broadcasting. In such a digital broadcasting receiver, it is considered that compressed internal image data or compressed internal voice data which is previously prepared in a memory is reproduced and outputted on the basis of a command by a user, for example. For example, it is considered that the compressed internal voice data previously prepared in the memory is reproduced and outputted in order to output a voice guide while waiting until the digital broadcasting receiver acquires program guide information.

When an image based on the compressed internal image data is inserted, the reproduction of the compressed broadcast image data obtained from the transport stream and the reproduction of the compressed internal image data must be switched. Similarly, when a voice based on the compressed internal voice data is inserted, the reproduction of the compressed broadcast voice data obtained from the transport stream and the reproduction of the compressed internal voice data must be switched.

In a case where the image based on the compressed internal image data is inserted, when the reproduction of the compressed internal image data and the reproduction of the compressed broadcast image data obtained from the transport stream are simply switched, a broadcast image and a broadcast voice may be shifted after the image based on the compressed internal image data is inserted. Similarly, in a case where the voice based on the compressed internal voice data is inserted, when the reproduction of the compressed broadcast voice data obtained from the transport stream and the reproduction of the compressed internal voice data are simply switched, a broadcast image and a broadcast voice may be shifted after the voice based on the compressed internal voice data is inserted

SUMMARY OF THE INVENTION

An object of the present invention is to provide a digital broadcasting receiver in which a broadcast image and a broadcast voice are not shifted after a voice based on compressed internal voice data is inserted.

Another object of the present invention is to provide a digital broadcasting receiver in which a broadcast image and a broadcast voice are not shifted after an image based on compressed internal image data is inserted.

A first digital broadcasting receiver according to the present invention is characterized by comprising a storage device storing compressed internal voice data; a selecting circuit for selecting and outputting either one of compressed broadcast voice data outputted from a TS separating circuit and the compressed internal voice data read out of the storage device and outputting the selected data; an extending circuit for extending the compressed broadcast voice data or the compressed internal voice data which is outputted from the selecting circuit; means for reading out, when the compressed broadcast voice data is selected by the selecting circuit, the compressed internal voice data to be inserted from the storage device in a partition between PES packets of the compressed broadcast voice data outputted from the TS separating circuit in inserting a voice based on the compressed internal voice data, and switching the selecting circuit such that the selecting circuit selects the compressed internal voice data; and means for counting the number of PES packets of the compressed broadcast voice data outputted from the TS separating circuit from the time point where the compressed internal voice data from the storage device is fed to the selecting circuit, and switching the selecting circuit such that the selecting circuit selects the compressed broadcast voice data outputted from the TS separating circuit when the counted number reaches the number of PES packets corresponding to the amount of the compressed internal voice data to be inserted.

A second digital broadcasting receiver according to the present invention is characterized by comprising a storage device storing compressed internal image data; a selecting circuit for selecting and outputting either one of compressed broadcast image data outputted from a TS separating circuit and the compressed internal image data read out of the storage device and outputting the selected data; an extending circuit for extending the compressed broadcast image data or the compressed internal image data which is outputted from the selecting circuit; means for reading out, when the compressed broadcast image data is selected by the selecting circuit, the compressed internal image data to be inserted from the storage device in a partition between PES packets of the compressed broadcast image data outputted from the TS separating circuit in inserting an image based on the compressed internal image data, and switching the selecting circuit such that the selecting circuit selects the compressed internal image data; and means for counting the number of PES packets of the compressed broadcast image data outputted from the TS separating circuit from the time point where the compressed internal image data from the storage device is fed to the selecting circuit, and switching the selecting circuit such that the selecting circuit selects the compressed broadcast image data outputted from the TS separating circuit when the counted number reaches the number of PES packets corresponding to the number of fields composing the compressed internal image data to be inserted.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
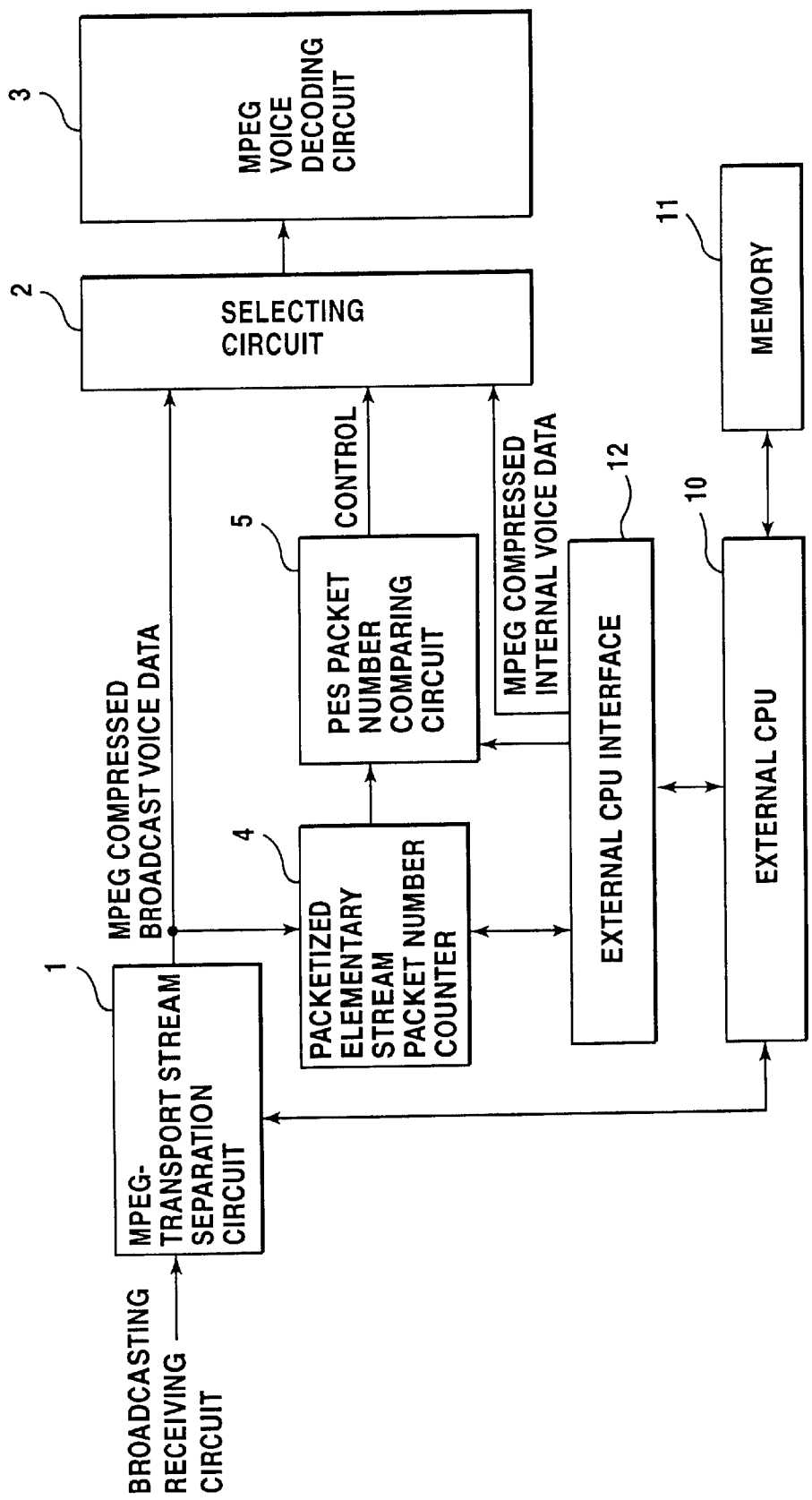
FIG. 1 is a block diagram showing the configuration of a digital broadcasting receiver.

Referring now to the drawings, description is made of an embodiment in a case where the present invention is applied to a BS digital broadcasting receiver.

FIG. 1 illustrates the configuration of a digital broadcasting receiver.

Description is now made of an embodiment in a case where a voice based on compressed internal voice data is inserted.

An MPEG-TS separating circuit 1 separates a packet sent from a tuner (not shown) into MPEG (Motion Picture Expert Group) compressed broadcast image data, MPEG compressed broadcast voice data, and attachment information such as program guide information.

The MPEG compressed broadcast voice data obtained by the separation in the MPEG-TS separating circuit 1 is generally fed to an MPEG voice decoding circuit 3 through a selecting circuit 2 and decoded, and is then fed to a speaker through a voice processing circuit and a voice output circuit (not shown).

The digital broadcasting receiver is provided with a PES packet number counter 4 for counting the number of PES (Packetized Elementary Stream) packets of the MPEG compressed broadcast voice data outputted from the MPEG-TS separating circuit 1, and a PES packet number comparing circuit 5 for comparing a value given from an external CPU 10 and the counted number by the PES packet number counter 4. The PES packet number counter 4 is controlled by the external CPU 10.

The external CPU 10 comprises a memory 11 storing MPEG compressed internal voice data. When a voice based on the MPEG compressed internal voice data is inserted, the external CPU 10 switches the selecting circuit 2 into internal voice data at a partition between the PES packets of the MPEG compressed broadcast voice data outputted from the MPEG-TS separating circuit 1, and reads out the necessary MPEG compressed internal voice data from the memory 11, to send the MPEG compressed internal voice data to the selecting circuit 2 through an external CPU interface 12. Therefore, the MPEG compressed internal voice data is fed to the MPEG voice decoding circuit 3 through the selecting circuit 2 and decoded, and is then fed to a speaker through a voice processing circuit and a voice output circuit (not shown).

The external CPU 10 operates the PES packet number counter 4, and feeds to the PES packet number comparing circuit 5 the number N of PES packets corresponding to the amount of the MPEG compressed internal voice data to be inserted. The PES packet number comparing circuit 5 switches, when the counted number by the PES packet number counter 4 reaches N, the selecting circuit 2 toward the MPEG compressed broadcast voice data from the MPEG-TS separating circuit 1.

By such control, a broadcast voice which is synchronized with a broadcast image is obtained after an internal voice is inserted, as in a case where the MPEG compressed broadcast voice data from the MPEG-TS separating circuit 1 is continuously reproduced. Accordingly, the broadcast image and the broadcast voice are prevented from being shifted.

By carrying out the same control using the same circuit configuration as that shown in FIG. 1 even when an internal image is inserted on the basis of the MPEG internal image data previously stored in the memory, a broadcast image which is synchronized with a broadcast voice is obtained after the internal image is inserted, as in a case where the MPEG compressed broadcast image data from the MPEG-TS separating circuit is continuously reproduced. In this case, the number N of PES packets corresponding to the number of fields composing the MPEG compressed internal image data to be inserted is set in the PES packet number comparing circuit 5.

According to the present invention, the broadcast image and the broadcast voice are not shifted after the voice based on the compressed internal voice data is inserted.

According to the present invention, the broadcast image and the broadcast voice are not shifted after the image based on the compressed internal image data is inserted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:

a storage device storing compressed internal voice data;

a selecting circuit for selecting and outputting either one of compressed broadcast voice data outputted from a Transport Stream (TS) separating circuit and compressed internal voice data read out of the storage device and outputting the selected data;

an extending circuit for extending the compressed broadcast voice data or the compressed internal voice data which is outputted from the selecting circuit;

means for reading out, when the compressed broadcast voice data is selected by the selecting circuit, the compressed internal voice data to be inserted from the storage device in a partition between Packetized Elementary Stream (PES) packets of the compressed broadcast voice data outputted from the TS separating circuit in inserting a voice based on the compressed internal voice data, and switching the selecting circuit such that the selecting circuit selects the compressed internal voice data; and means for counting the number of PES packets of the compressed broadcast voice data outputted from the TS separating circuit from the time point where the compressed internal voice data from the storage device is fed to the selecting circuit, and switching the selecting circuit such that the selecting circuit selects the compressed broadcast voice data outputted from the TS separating circuit when the counted number reaches the number of PES packets corresponding to the amount of the compressed internal voice data to be inserted.

2. A digital broadcasting receiver comprising:

a storage device storing compressed internal image data;

a selecting circuit for selecting and outputting either one of compressed broadcast image data outputted from a Transport Stream (TS) separating circuit and the compressed internal image data read out of the storage device and outputting the selected data;

an extending circuit for extending the compressed broadcast image data or the compressed internal image data which is outputted from the selecting circuit;

means for reading out, when the compressed broadcast image data is selected by the selecting circuit, the compressed internal image data to be inserted from the storage device in a partition between Packetized Elementary Stream (PES) packets of the compressed broadcast image data outputted from the TS separating circuit in inserting an image based on the compressed internal image data, and switching the selecting circuit such that the selecting circuit selects the compressed internal image data; and means for counting the number of PES packets of the compressed broadcast image data outputted from the TS separating circuit from the time point where the compressed internal image data from the storage device is fed to the selecting circuit, and switching the selecting circuit such that the selecting circuit selects the compressed broadcast image data outputted from the TS separating circuit when the counted number reaches the number of PES packets corresponding to the number of fields composing the compressed internal image data to be inserted.

* * * * *